(12) United States Patent
Yu et al.

(10) Patent No.: US 12,460,707 B2
(45) Date of Patent: Nov. 4, 2025

(54) AUXILIARY DRIVING MECHANISM OF NEW ENERGY VEHICLE

(71) Applicant: ZHE JIANG SIEKON TRANSMISSION TECHNOLOGY CO., LTD, Zhejiang (CN)

(72) Inventors: Wenyong Yu, Zhejiang (CN); Yang Zhu, Zhejiang (CN); Chao Yang, Zhejiang (CN); Fengli Huang, Zhejiang (CN)

(73) Assignee: ZHE JIANG SIEKON TRANSMISSION TECHNOLOGY CO., LTD, Jiaxing (CN)

(*) Notice: Subject to any disclaimer, the term of this patent is extended or adjusted under 35 U.S.C. 154(b) by 0 days.

(21) Appl. No.: 19/022,272

(22) Filed: Jan. 15, 2025

(65) Prior Publication Data

US 2025/0189023 A1    Jun. 12, 2025

Related U.S. Application Data

(63) Continuation of application No. PCT/CN2024/111955, filed on Aug. 14, 2024.

(30) Foreign Application Priority Data

Dec. 8, 2023  (CN) .......................... 202323355275.0

(51) Int. Cl.
*F16H 37/08*    (2006.01)
(52) U.S. Cl.
CPC ... *F16H 37/082* (2013.01); *F16H 2200/0021* (2013.01); *F16H 2200/0034* (2013.01)

(58) Field of Classification Search
CPC ............... F16H 37/082; F16H 37/0826; F16H 2200/0021; F16H 2200/0034; B60L 50/60
See application file for complete search history.

(56) References Cited

FOREIGN PATENT DOCUMENTS

| CN | 109677261 A | 4/2019 |
|---|---|---|
| CN | 210830328 U | 6/2020 |
| CN | 112923044 A | 6/2021 |

(Continued)

OTHER PUBLICATIONS

CN468 translation (Year: 2022).*

(Continued)

*Primary Examiner* — Huan Le
(74) *Attorney, Agent, or Firm* — HOWARD M COHN and Associates, LLC

(57) ABSTRACT

Disclosed is an auxiliary driving mechanism of a new energy vehicle, including a main motor, a reduction gear, a differential gear, an auxiliary motor, and a multi-speed gearbox. The multi-speed gearbox includes a housing, an auxiliary drive shaft, an intermediate shaft, and a connecting shaft, the auxiliary drive shaft is connected to the auxiliary motor, a plurality of first-stage reducing gear sets are arranged between the auxiliary drive shaft and the intermediate shaft, and a clutch is arranged on the auxiliary drive shaft; the clutch allows only one of the first-stage reducing gear sets to transmit the power of the auxiliary motor or disconnect the power between the auxiliary drive shaft and the intermediate shaft; a pair of transmission gear sets are arranged between the intermediate shaft and the connecting shaft.

3 Claims, 2 Drawing Sheets

(56) References Cited

FOREIGN PATENT DOCUMENTS

| | | | | |
|---|---|---|---|---|
| CN | 215487468 U | * | 1/2022 | ............. F16H 3/093 |
| CN | 115027244 A | | 9/2022 | |
| CN | 219769642 U | | 9/2023 | |
| CN | 221476687 U | | 8/2024 | |
| WO | 2020030212 A1 | | 2/2020 | |

OTHER PUBLICATIONS

International Search Report issued in corresponding International application No. PCT/CN2024/111955, mailed Oct. 30, 2024 (7 pages ).
Written Opinion of the International Search Authority in corresponding International application No. PCT/CN2024/111955, mailed Oct. 30, 2024 (7 pages).

* cited by examiner

AUXILIARY DRIVING MECHANISM OF NEW ENERGY VEHICLE

TECHNICAL FIELD

The present disclosure belongs to the technical field of automobile transmission, and more specifically relates to an auxiliary driving mechanism of a new energy vehicle.

BACKGROUND

For most new energy vehicles in the past, wheels of the new energy vehicle are driven to rotate by connecting a motor to a reduction gear (gearbox) and then connecting the reduction gear to a vehicle differential gear (as shown in FIG. 2). However, such a driving way causes the vehicle to travel at a low speed (20-30 km/h) in the case of a low-speed domain (urban street), which results in the motor running in a low-efficiency state, making the power consumption of the motor during vehicle travelling at a low speed higher than that during vehicle travelling at a constant speed.

SUMMARY

In view of the shortcomings in the prior art, the present disclosure provides an auxiliary driving mechanism of a new energy vehicle, which adds an auxiliary drive on the basis of the original driving structure, so as to reduce the power consumption caused by the vehicle travelling at a low speed.

To achieve the above objective, the present disclosure provides the following technical solution: an auxiliary driving mechanism of a new energy vehicle includes a main motor, a reduction gear, and a differential gear, where the auxiliary driving mechanism further includes an auxiliary motor and a multi-speed gearbox, the multi-speed gearbox includes a housing, an auxiliary drive shaft, an intermediate shaft, and a connecting shaft, the auxiliary drive shaft is connected to the auxiliary motor, a plurality of first-stage reducing gear sets are arranged between the auxiliary drive shaft and the intermediate shaft, and a clutch is arranged on the auxiliary drive shaft; the clutch allows only one of the first-stage reducing gear sets to transmit the power of the auxiliary motor or disconnect the power between the auxiliary drive shaft and the intermediate shaft; a pair of transmission gear sets are arranged between the intermediate shaft and the connecting shaft; and one end of the connecting shaft is detachably connected to the main motor, and the other end of the connecting shaft is connected to an input shaft of the reduction gear.

Further, a transmission gear set of the same stage is arranged between the auxiliary drive shaft and the intermediate shaft, the transmission gear set includes two gears of the same stage, and the two gears of the same stage are respectively connected to the auxiliary drive shaft and the intermediate shaft.

Further, each of the first-stage reducing gear sets includes a first gear and a second gear, the first gear is located on the auxiliary drive shaft, the second gear is located on the intermediate shaft, and the first gear is smaller than the second gear.

Further, the transmission gear set is a second-stage reducing gear set; and the second-stage reducing gear set includes a third gear and a fourth gear, the third gear is located behind the intermediate shaft, and the fourth gear is located on the connecting shaft.

Compared with the prior art, the present disclosure has the beneficial effects that when a vehicle is traveling in a low-speed domain, the main motor stops, the auxiliary motor drives the auxiliary drive shaft to rotate, the clutch controls one of the first-stage reducing gear sets to transmit power to the intermediate shaft, the second-stage reducing gears arranged between the intermediate shaft and the connecting shaft transmit the power to the reduction gear, and then the reduction gear transmits the power to the differential gear and wheels. In this way, when the vehicle is traveling at low speeds, it is only driven by the auxiliary motor with lower power, and the power required for the vehicle travelling at a low speed can be met after multi-stage speed reduction, thus reducing the power consumption caused by the vehicle travelling at a low speed.

Figure 1:
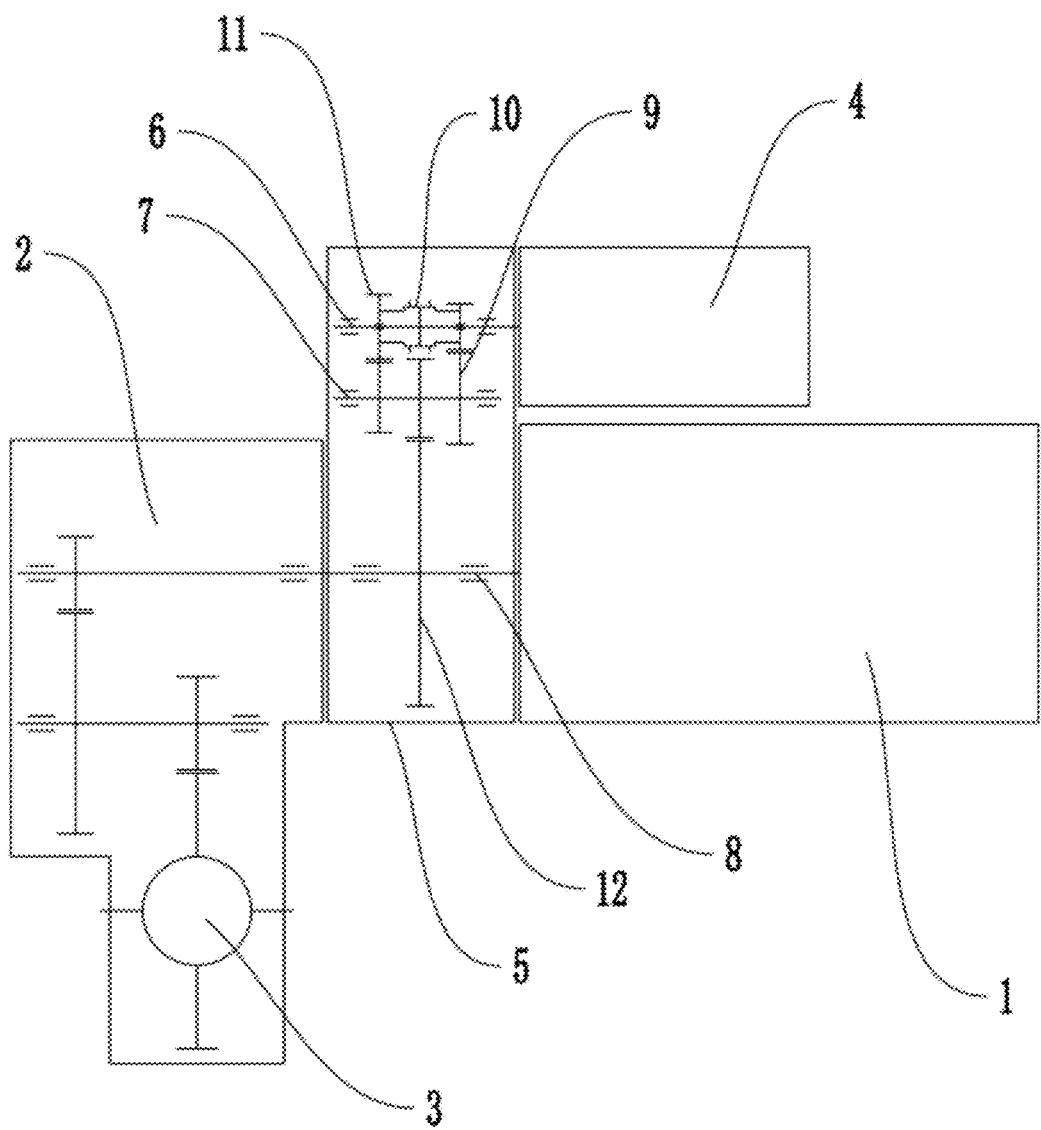
FIG. 1 is a schematic structural diagram of an auxiliary driving mechanism of a new energy vehicle according to the present disclosure.

Description of reference numerals: 1 denotes a main motor; 2 denotes a reduction gear; 3 denotes a differential gear; 4 denotes an auxiliary motor; 5 denotes a housing; 6 denotes an auxiliary drive shaft; 7 denotes an intermediate shaft; 8 denotes a connecting shaft; 9 denotes first-stage reducing gear sets; 10 denotes a clutch; 11 denotes a transmission gear set of the same stage; and 12 denotes a second-stage reducing gear set.

DETAILED DESCRIPTION

In the description of the present disclosure, it should be noted that for nouns of locality, the orientation and position relationships indicated by the terms such as "center," "horizontal (X)," "longitudinal (Y)," "vertical (Z)," "length," "width," "thickness," "up," "down," "front," "back," "left," "right," "upright," "lateral,' "top," "bottom," "inside," "outside," "clockwise," and "counterclockwise" are based on the orientation or position relationships shown in the accompanying drawings, are only for convenience of describing the present disclosure and simplifying the description, and do not indicate or imply that the indicated device or element must have a specific orientation, or be constructed and operated in a specific orientation, and therefore cannot be understood as a limitation on the specific protection scope of the present disclosure.

In addition, the descriptions of terms "first," "second," and the like are only used for descriptive purposes, and cannot be understood as indicating or implying their relative importance or implying the number of indicated technical features. Therefore, the features defined with "first" and "second" may explicitly or implicitly include one or more of these features. In the description of the present disclosure, the meanings of "several" and "a plurality of" are two or more, unless otherwise clearly and specifically defined.

The present disclosure will be further described with reference to FIG. 1 and FIG. 2.

An auxiliary driving mechanism of a new energy vehicle includes a main motor 1, a reduction gear 2, and a differential gear 3. The auxiliary driving mechanism further includes an auxiliary motor 4 and a multi-speed gearbox. The multi-speed gearbox includes a housing 5, an auxiliary drive shaft 6, an intermediate shaft 7, and a connecting shaft 8. The auxiliary drive shaft 6 is connected to the auxiliary motor 4. A plurality of first-stage reducing gear sets 9 are arranged between the auxiliary drive shaft 6 and the intermediate shaft 7. A clutch 10 is arranged on the auxiliary drive shaft 6. The clutch 10 allows only one of the first-stage reducing gear sets 9 to transmit the power of the auxiliary motor 4 or disconnect the power between the auxiliary drive shaft 6 and the intermediate shaft 7. A pair of transmission gear sets are arranged between the intermediate shaft 7 and the connecting shaft 8. One end of the connecting shaft 8 is detachably connected to the main motor 1, and the other end of the connecting shaft 8 is connected to an input shaft of the reduction gear 2.

Preferably, in this embodiment, when an auxiliary drive motor is running, the connecting shaft 8 is separated from the main motor 1 to avoid the reverse transmission of power to the main motor 1.

Figure 2:
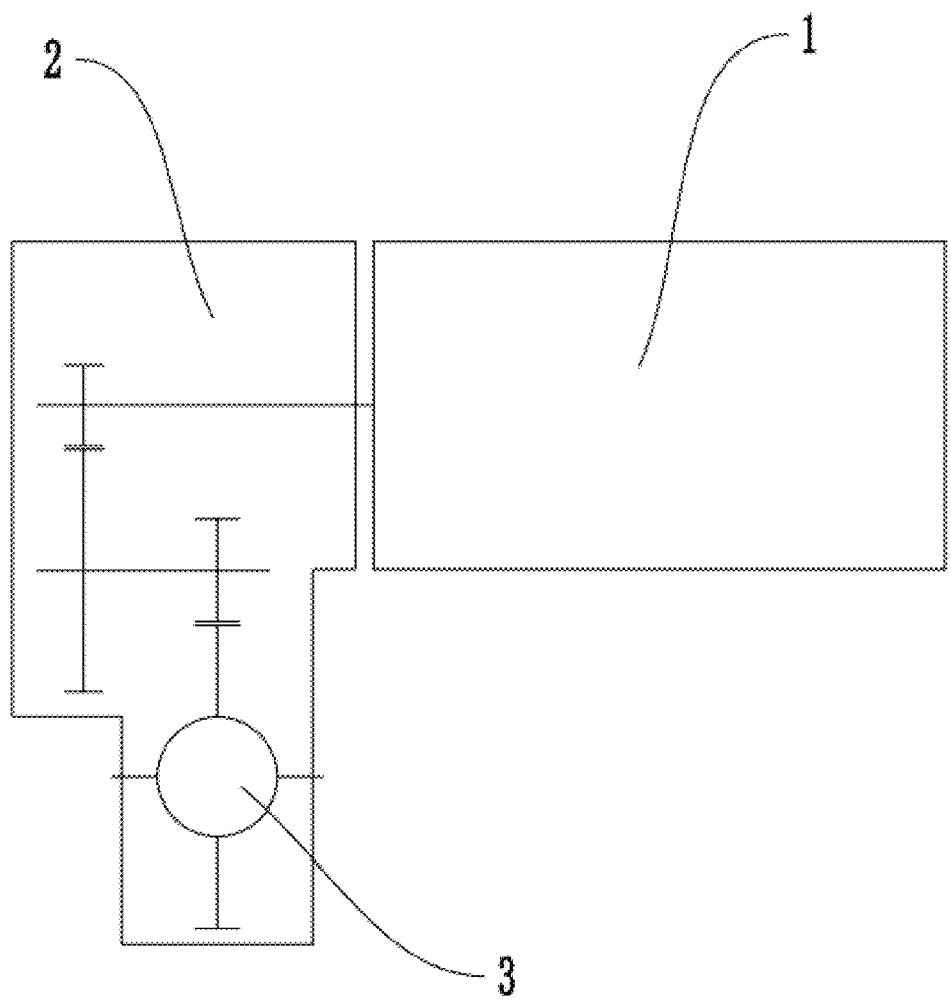
FIG. 2 is a schematic structural diagram of a driving structure in the prior art.

As shown in FIG. 1, preferably, in this embodiment, a transmission gear set 11 of the same stage is arranged between the auxiliary drive shaft 6 and the intermediate shaft 7. The transmission gear set includes two gears of the same stage. The two gears of the same stage are respectively connected to the auxiliary drive shaft 6 and the intermediate shaft 7.

As shown in FIG. 1, preferably, in this embodiment, each of the first-stage reducing gear sets 9 includes a first gear and a second gear. The first gear is located on the auxiliary drive shaft 6. The second gear is located on the intermediate shaft 7. The first gear is smaller than the second gear.

As shown in FIG. 1, preferably, in this embodiment, the transmission gear set is a second-stage reducing gear set 12. The second-stage reducing gear set 12 includes a third gear and a fourth gear. The third gear is located behind the intermediate shaft 7. The fourth gear is located on the connecting shaft 8.

As shown in FIG. 1, when a vehicle is traveling in a low-speed domain, the main motor 1 stops. The auxiliary motor 4 drives the auxiliary drive shaft 6 to rotate. The clutch 10 controls one of the first-stage reducing gear sets 9 to transmit power to the intermediate shaft 7. The second-stage reducing gears arranged between the intermediate shaft 7 and the connecting shaft 8 transmit the power to the reduction gear 2. Then the reduction gear 2 transmits the power to the differential gear 3 and wheels. In this way, when the vehicle is traveling at low speeds, it is only driven by the auxiliary motor 4 with lower power, and the power required for the vehicle travelling at a low speed can be met after multi-stage speed reduction, thus reducing the power consumption caused by the vehicle travelling at a low speed.

Preferably, in this embodiment, in a high-power vehicle such as a sports car with large surplus driving force, the power saving effect is more obvious.

Preferably, in this embodiment, the auxiliary driving mechanism can be equipped with the auxiliary motor 4 and the multi-speed gearbox without modifying the original driving mechanism.

Table of improvements with auxiliary driving unit being equipped:

|  | Power consumption | Average efficiency | Improvement rate |
| --- | --- | --- | --- |
| Existing driving unit | 2988 kJ | 84.5% | / |
| Equipped with auxiliary driving unit | 2793 kJ | 90.4% | +6.5% |

A two-speed gearbox is taken as an example:

|  | Motor | | |
| --- | --- | --- | --- |
|  | Torque | Output | Reduction ratio |
| Existing driving unit | 300 Nm | 157 kw | 8.0 |
| Auxiliary driving unit | 50 Nm | 26 kw | First gear: 30.0; second gear: 20.0 |

The above are only preferred embodiments of the present disclosure, and the scope of protection of the present disclosure is not limited to the above embodiments. Any technical solution belonging to the concept of the present disclosure is within the scope of protection of the present disclosure. It should be pointed out that a person of ordinary skill in the art may further make a plurality of improvements and modifications without departing from the principle of the present disclosure, and these improvements and modifications shall fall within the protection scope of the present disclosure.

What is claimed is:

1. An auxiliary driving mechanism of a new energy vehicle, comprising a main motor, a reduction gear, and a differential gear, wherein the auxiliary driving mechanism further comprises an auxiliary motor and a multi-speed gearbox, the multi-speed gearbox comprises a housing, an auxiliary drive shaft, an intermediate shaft, and a connecting shaft, the auxiliary drive shaft is connected to the auxiliary motor, a plurality of first-stage reducing gear sets are arranged between the auxiliary drive shaft and the intermediate shaft, and a clutch is arranged on the auxiliary drive shaft; the clutch allows only one of the first-stage reducing gear sets to transmit the power of the auxiliary motor or disconnect the power between the auxiliary drive shaft and the intermediate shaft; a pair of transmission gear sets are arranged between the intermediate shaft and the connecting shaft; and one end of the connecting shaft is detachably connected to the main motor, and the other end of the connecting shaft is connected to an input shaft of the reduction gear;

wherein a transmission gear set of the same stage is arranged between the auxiliary drive shaft and the intermediate shaft, the transmission gear set comprises two gears of the same stage, and the two gears of the same stage are respectively connected to the auxiliary drive shaft and the intermediate shaft.

2. The auxiliary driving mechanism of a new energy vehicle according to claim 1, wherein each of the first-stage reducing gear sets comprises a first gear and a second gear, the first gear is located on the auxiliary drive shaft, the second gear is located on the intermediate shaft, and the first gear is smaller than the second gear.

3. The auxiliary driving mechanism of a new energy vehicle according to claim 2, wherein the transmission gear set is a second-stage reducing gear set; and the second-stage reducing gear set comprises a third gear and a fourth gear, the third gear is located on the intermediate shaft, and the fourth gear is located on the connecting shaft.

* * * * *